Sept. 8, 1936. E. S. CORNELL, JR 2,053,262
BRACKET FOR PLUMBING FITTINGS
Filed March 25, 1933
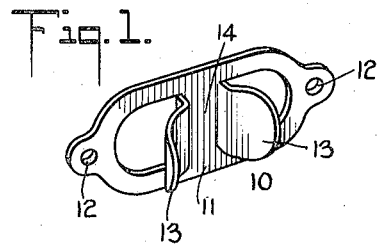
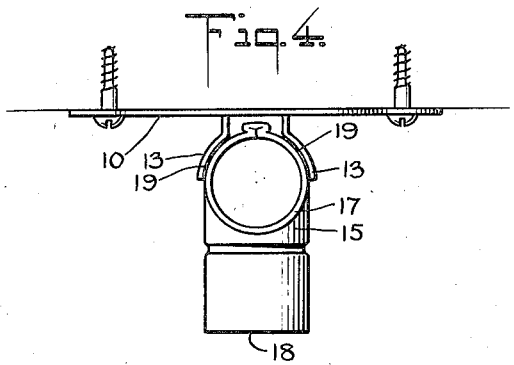
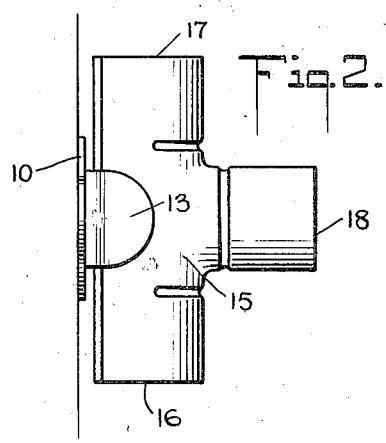
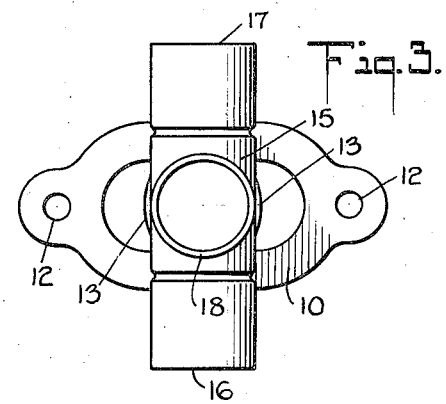
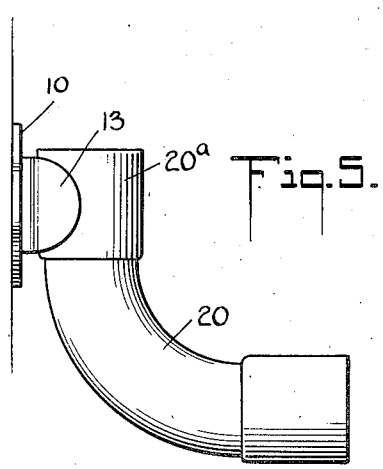
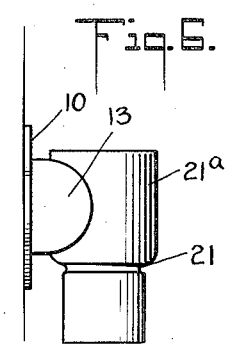
INVENTOR,
EDWARD S. CORNELL, JR.
BY
HIS ATTORNEY.

Patented Sept. 8, 1936

2,053,262

UNITED STATES PATENT OFFICE 2,053,262

BRACKET FOR PLUMBING FITTINGS

Edward S. Cornell, Jr., Larchmont, N. Y., assignor to American Radiator Company, New York, N. Y., a corporation of New Jersey Application March 25, 1933, Serial No. 662,724

1 Claim. (Cl. 248—65)

This invention relates to brackets and therewith combined pipe fittings.

My invention is directed to brackets, preferably formed of copper, high copper content alloys and other suitable material, embodying essentially a supporting base adapted to be secured by screws or other suitable attachment means to building constuction parts; such bracket further comprises ears, extending respectively, preferably integrally, from opposite sides of a portion of the supporting base, and curvedly therefrom, arranged to be secured by solder or other suitable means to a T, elbow, union, cap or other suitable pipe fitting.

My invention has particular application to wrought copper or sheet copper pipe fittings, inclusive of T's conforming to the construction set forth in my U. S. Patent #1,850,049, granted March 15, 1932, 90°, 45° and other angular elbows of the types with and without cupped ends, reducers, unions, etc., the last-named being set forth more particularly in my copending application entitled Method of interrelating fittings for pipes, tubes and the like and the resulting combined structures, filed March 10, 1933, and bearing Serial No. 660,228.

In the commercial utilization of my aforesaid T construction and various types of elbows, reducers, unions, caps, etc., the joints are effected by telescoped internal or external connections and secured by solder applied under increased temperature condition whereby upon congealing the bonding medium effects a liquid- and gas-sealed joint capable of withstanding the necessary stresses and strains.

In commercial practice of installation, brackets embodying the present invention are utilized for the support of the pipe fittings, and securement of the pipe fitting had by use of the same soldering medium.

Such utilization of my invention results in combined structures of the bracket respectively with such T and other pipe fittings, which combined structures are deemed also as exemplifications of my invention.

Further features and objects of the invention will be more fully understood from the following detail description and the accompanying drawing, in which Fig. 1 is a perspective view of a preferred form of bracket embodying my invention;

Fig. 2 is a side elevation of a combined bracket and T; Fig. 3 is a front elevation of Fig. 2; and Fig. 4 is a top plan view of Figs. 2 and 3.

Fig. 5 is a side elevation of a combined bracket and elbow;

Fig. 6 is a side elevation of a combined bracket and reducer.

Referring to the drawing, the bracket 10 comprises essentially a base 11, usually provided with spaced openings 12, 12, for the reception of screws, nails, etc., for securement to a wooden stud or other appropriate building construction part. The bracket comprises further the wings 13, 13, projecting from, and preferably integral, with the base portion 14.

Advantageously, the bracket may be formed by blanking and forming the respective individual parts. Copper and high copper content alloys are preferred materials.

As is illustrated in Fig. 2, the bracket is combinable with a T 15, such as of sheet metal construction disclosed in my U. S. Patent #1,850,049. The T may also conform to the construction of my integral T, as set forth and claimed in my copending application Serial No. 584,021, filed December 31, 1931, entitled Process of forming sheet metal pipe fittings and resulting product.

As appears in my aforesaid Patent #1,850,049, the connections at the opposite body end openings 16, 17, and the lateral opening 18 of the T 15, or equivalent, are had by the use of solder, which is conveniently applied by the use of a torch or the like to pre-heat the respective ends of the T and the ends of a pipe, tube or pipe fittings, by telescoped connection; the clearances between the overlapping end portions afford capillary or surface flow of the bonding medium when in heated fluid status and upon congealing the overlapped ends are bonded to effect a sealed joint which is proof against the liquid and gas leakage.

Such resulting structure is a T combined with bracket means for securement of the same to a suitable component part of a building or other structure.

In like manner, my bracket is combined with other appropriate pipe fittings. In Fig. 5, I illustrate the aforesaid or equivalent bracket 10 combined with an elbow 20, as by securement of peripheral area of its cupped, and enlarged, end 20a to the respective ears 13, 13 of the bracket, by solder or other appropriate bonding medium. The elbow may be of any desired angle and cupped at either or both ends. In Fig. 6, I illustrate my aforesaid bracket 10 or equivalent combined with a reducer 21, as by securement of peripheral area of its enlarged end portion 21a to the respective bracket ears 13, 13.

In like manner, my bracket is combinable with other suitable forms of pipe fittings such as caps, adapters, etc.

In commercial use of the above and other bracketed elbows, bracketed reducers, etc., the connections with abutting pipe ends, tubes, adapters, etc., are effected by soldered sweated joints.

My invention affords advantages of minimum stocking of inventory of requisite items, in that the brackets are purchased and stocked as individual brackets and the T's, elbows, reducers, etc., are stocked as individual pipe fittings, the latter named group of pipe fittings being usable for general purposes as well as for combined structure with the brackets. Such application of my invention also has the advantage of precise relationship of securement of the selected pipe fitting to the bracket to meet the particular conditions encountered in individual installations, thus facilitating the roughing-out process of pipe lengths and pipe fitting requirements and affording satisfactory installations at low cost of material and labor.

Advantageously, as is indicated in Fig. 4, the areas of bonding, as by the indicated solder 19, extend over the inner faces of the respective ears 13, 13.

In commercial applications of my invention, the ears 13, 13, are arcuately contoured and spaced relative to one another in correspondence to the effective arcuate contour of the pipe fitting to be combined therewith. Preferably, as indicated in the drawing the effective contour of each pipe fitting is circularly cylindrical and therefore the effective contour of each ear is a zone of a circular cylinder.

Pipe fittings, of present day accepted range of opening sizes, of say, from three-eighths of an inch to, say, two inches and upwards at one-quarter of an inch range of sizes, are furnished to the trade, pursuant to my copending application Serial No. 660,228, filed March 10, 1933, entitled Method of interrelating fittings, for pipes, tubes and the like and the resulting combined structures, the brackets are furnished of corresponding "sizes", that is, coincident in contour (and spacing) to conform to the peripheral contours of T's, elbows, reducers, etc., of the respective sizes.

Whereas I have described my invention by reference to specific forms thereof it will be understood that many changes and modifications may be made without departing from the spirit of the invention.

I claim:

An improved bracket for plumbing fittings comprising, a base of sheet metal, ear elements formed integral with and struck up from the base, said ear elements being spaced from each other and from the base, and contoured on their faces remote from the base on the surface of a cylinder, means interposed between the inner ends of the ear elements and the base, to space the ear elements from the base, said means comprising elements arranged parallel to and spaced apart from each other, to form a receiving space between the inner end of the ear elements and the base, and means permitting securement of the bracket to a wall or other support.

EDWARD S. CORNELL, Jr.